C. F. FLEMING.
APPARATUS FOR BOXING AND NET WEIGHING MATERIALS.
APPLICATION FILED MAR. 3, 1919.
1,310,747.
Patented July 22, 1919.
2 SHEETS—SHEET 2.
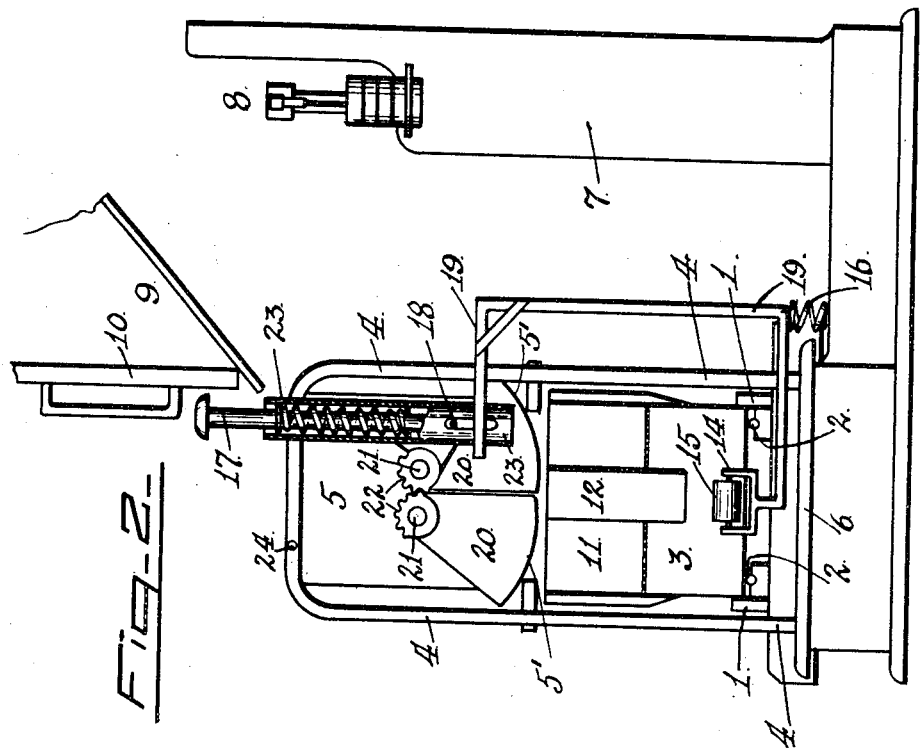
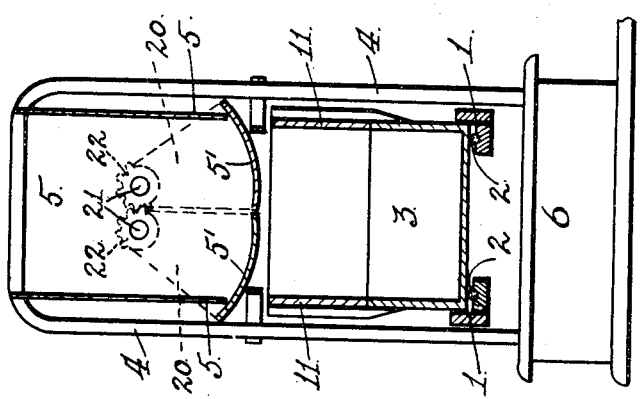
WITNESS
Wm F. Drew
INVENTOR
Charles F. Fleming
BY
Booth & Booth
ATTORNEYS

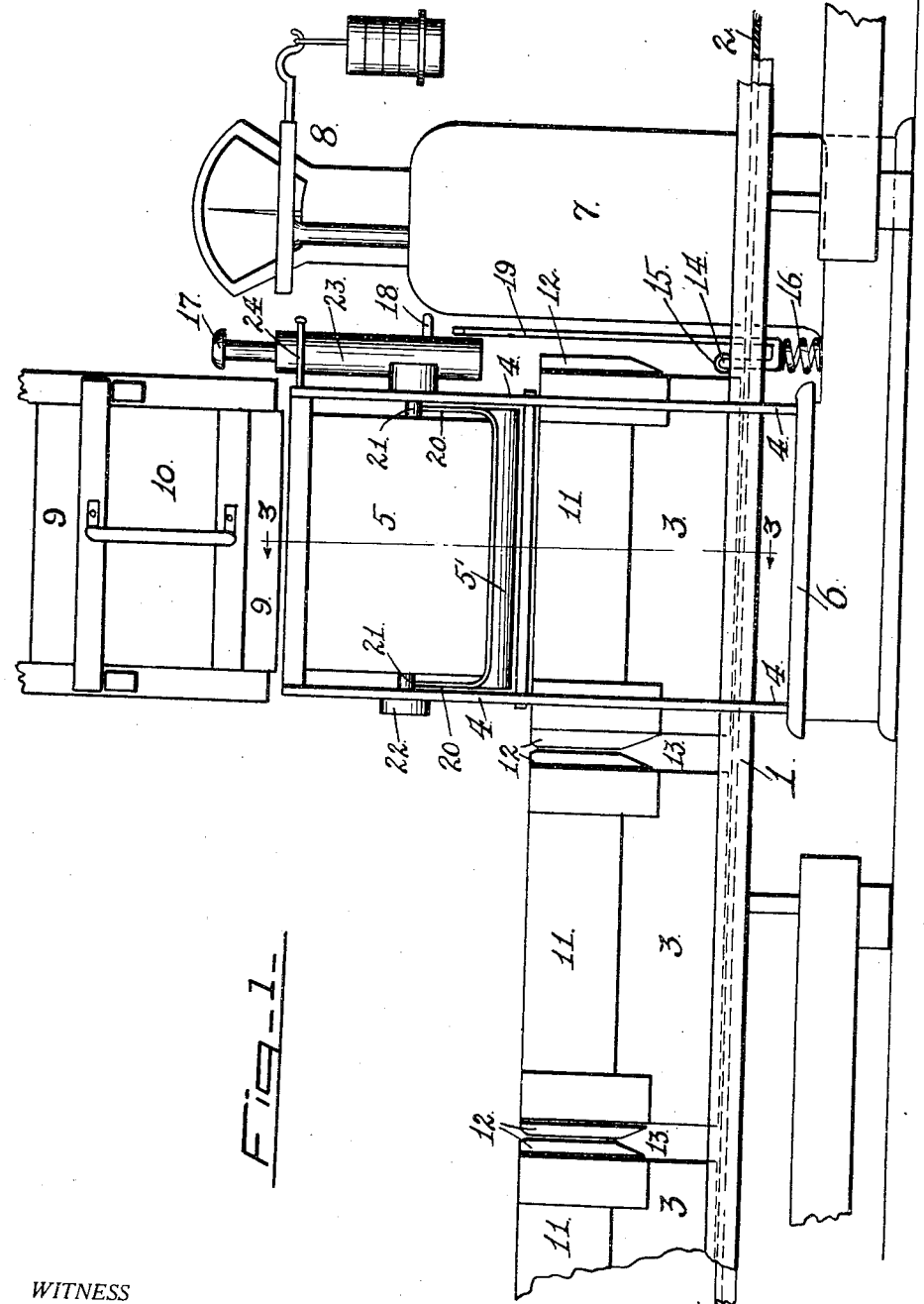

UNITED STATES PATENT OFFICE.

CHARLES F. FLEMING, OF SAN JOSE, CALIFORNIA.

APPARATUS FOR BOXING AND NET-WEIGHING MATERIALS.

1,310,747.     Specification of Letters Patent.     Patented July 22, 1919.

Application filed March 3, 1919. Serial No. 280,311.

*To all whom it may concern:*

Be it known that I, CHARLES F. FLEMING, a citizen of the United States, residing at San Jose, in the county of Santa Clara and State of California, have invented certain new and useful Improvements in Apparatus for Boxing and Net-Weighing Materials, of which the following is a specification.

My invention relates to means for boxing and net-wieghing commodities, and particularly to apparatus for use in dried-fruit plants, in which the commodities, such, for example, as dried prunes, are delivered to boxes and the net-weight of the contents determined. In common practice, the prunes are delivered to the box while the latter is on the scales, and, according to the size of the box, its assumed standard weight is provided for in the determination of the net weight of the contents. But as, in fact, the boxes, even of the same size, differ in weight, it is apparent that any assumed or standard weight of the box is in many cases fallacious. And when to this inaccuracy there is added the fact that each box has fitted to its edge a temporary filling form, and that these forms differ in weight, it will be seen that the error of a stated weight for each box and its form, is aggravated in arriving at the net-weight of the contents.

In handling large quantities of materials it is not practicable nor is it the custom to weigh each box and its form and subtract this weight from the weight of the filled box. To save time and labor the scales are set to compensate for an assumed or standard weight of the box and form, so that the boxes may be run in quick succession on the scales, and the net readings taken immediately. The error thus arising is serious not only because of the strictures, and consequent loss of reputation, which the packer suffers from those customers who happen to receive the underweight goods, but also because of the strictness of the law that true net weight be given.

These considerations have led me to devise an apparatus which is capable of rapid work and which will give the true net weight. In reaching these results, I will handle a continuous procession of boxes as quickly and efficiently as before, but these boxes are never on the scales and their varying weights therefore play no part. The charging hopper which is of fixed weight is alone on the scales, so that a fixed compensation may be made and only the weight of the charge in the hopper taken as true net weight. To attain the result efficiently and rapidly, my apparatus comprises in general terms, a charging hopper supported on the scale platform, a carrier independent of the scale platform, for conveying the boxes successively into receiving relation with the charging hopper, but wholly out of contact therewith, means for delivering the net weight charge from the hopper into the box, means for arresting the travel of the box while receiving the charge, and means for releasing the filled box for its continued travel to destination. This apparatus together with details of construction I shall now fully describe by reference to the accompanying drawings, in which, Figure 1 is a front elevation of my apparatus.

Fig. 2 is an end view of the same.

Fig. 3 is a sectional view on the line 3—3 of Fig. 1.

1 is a runway in which is a traveling carrier of suitable nature, here shown, for example as a pair of cables 2. 3 are the boxes or containers adapted to fit in the runway, and by means of the cables 2 to be advanced therein.

4 is the stand of the charging hopper 5. This stand straddles the runway 1, without touching it, so that it is wholly independent of it, but is in position to hold its hopper 5 directly over but out of contact with the boxes which pass beneath it.

6 is the platform of a scales of which 7 is the standard and 8 the weight determining mechanism, here shown generally and somewhat diagrammatically, as these need not be described in detail, it being sufficient to say that it is provided with the usual reading devices by which the weight on the platform may be read.

9 is a feed chute, with a regulating gate 10, for delivering the material to the charging hopper. This chute is supported wholly independent of the charging hopper, it being borne in mind that no part of the apparatus rests on the scale platform except the charging hopper and its stand.

It will now be seen that if a box 3 be carried under the charging hopper and while there, should receive its charge from the hopper, the net weight of this charge previously ascertained by weighing it while in the hopper the scales being normally set to compensate for the fixed weight of the hopper and its stand, is the knowledge sought and this net weight is accurate, being wholly independent of variation in the weight of the boxes which as before explained, plays no part. Therefore, the net weight of each packed box can be given with accuracy, as the only compensation necessary is the fixed weight of the charging hopper and its stand.

Now in order to make the apparatus operative continuously and efficiently to handle the goods in large quantities, the following features are to be noted:

Over the rim of each box is fitted temporarily the usual form 11. On each end of each form is a spacing lug 12 and two opposing ones of these lugs contacting provide for a space 13 between the boxes, which space I utilize for positioning and rendering operative a trip stop 14 by which a box is arrested and held under the charging hopper, to receive its charge, and by which said box when charged is released and carried off while a succeeding box and the line behind it are advanced one step.

The stop 14 may be of any character, it being here shown, Fig. 2, as a bracket carrying a roll 15, the stop being adapted for vertical movement to come up in front of a box and to be depressed to release the box. To effect this movement, a spring 16 is arranged to hold the stop normally elevated. To depress it there is a spring controlled push rod 17 on the side of the charging hopper, said push rod having an arm 18 which lies normally above and is adapted to move down into contact with the extension frame 19 of the trip stop. As the push rod is held up normally out of contact with the extension frame of the stop, the latter in no wise affects the normal weight of the hopper, which is thus still a fixed quantity for compensation. At the time the push rod is pressed down to operate the stop, the weighing of the charge has been completed, and, therefore, this contact does not affect the net weight desired.

The charging hopper is constructed as follows: It comprises a bottomless body member 5, and two segmental bottom members 5', which are adapted in opening and closing to scrape the side edges of the body-member, as indicated in Fig. 3. These bottom members 5' have end flanges 20 which play upon the ends of the body member being carried on axes 21 rocking in said body ends. Intermeshing segmental gears 22 are here shown as suitable means for connecting the axes of the two bottom members, so that they move in unison. To operate these bottom members, I have a lever 23, on the axis of one of said members, and in order to facilitate the work, I make this lever 23 in the form of a sleeve and mount the push rod 17, heretofore described, within it. A fixed stop 24 on the end of the hopper serves to limit the swing of the lever 23.

The operation of the apparatus is as follows:—

A line of boxes 3 with their forms 11 is placed in the runway 1, on the traveling cables 2. When the foremost box reaches the normally elevated trip-stop 14, the line is arrested, the cables moving on under the boxes. In this position the foremost box lies under the charging hopper 5. The operator having previously admitted a charge from the feed chute 9 to the charging hopper 5 to the required net weight as indicated on the compensated scale beam, now swings forward the lever 23, with the effect of separating the two bottom members 5' of the hopper 5. These members scraping the side edges of the hopper insure the delivery of the entire contents, which, in the case of sticky fruit or other like materials, such, for example, as prunes, is of decided advantage in rendering the net weight accurate as delivered to the box. This dumps the net-weight charge into the underlying box 3. The operator now, immediately throwing the lever 23 to its initial position, presses down the push-rod 17 with the effect of depressing the stop 14 and tripping the box, so that said box and the whole line behind it are picked up by the cables 2 and advanced. The push rod 17 is now instantly released so that the stop 14, due to its spring 16 rises under the advancing filled box, and when the space 13 between the boxes, due to the end spacing lugs 12 of the forms 11 comes over the stop 14, the latter jumps up into said space and thus arrests the succeeding box and the whole back line, while the filled box continues on to its destination; and thus the operation continues.

I claim:

1. An apparatus for the described purpose comprising a charging-hopper; a weighing-scale upon which said hopper is supported whereby the net-weight of the charge in the hopper is ascertained by compensating for the fixed weight of the hopper; means, independent of the hopper for supplying the latter with a charge; a traveling conveyer for introducing a container under the charging-hopper and supporting it there independent of the hopper and scale; means for dumping the net-weight charge into said container; and a stop contacting with and arresting the container on the conveyer while receiving its charge and releasing it when charged, to continue its advance with said conveyer.

2. An apparatus for the described purpose comprising a charging-hopper; a weighing-scale upon which said hopper is supported whereby the net-weight of the charge in the hopper is ascertained by compensating for the fixed weight of the hopper; means, independent of the hopper for supplying the latter with a charge; a traveling conveyer for introducing a container under the charging-hopper and supporting it there independent of the hopper; means for dumping the net-weight charge into said container; and means for arresting the container while receiving its charge and releasing it when charged, to continue its advance, consisting of a spring-controlled stop acting against the end of the container, and a push rod carried by the hopper and adapted to make and break contact with said stop to depress it and allow its return.

3. An apparatus for the described purpose comprising a charging-hopper having swinging bottom members adapted to scrape its side edges in opening and closing, a weighing-scale upon which said hopper is supported whereby the net weight of the charge in the hopper is ascertained by compensation for the fixed weight of the hopper; means, independent of the hopper for supplying the latter with a charge; a traveling conveyer for introducing a container under the charging hopper and supporting it there independent of the hopper and scale; a connection between the axes of the swinging bottom members of the hopper whereby they act in unison; and a lever on the axis of one of said members.

4. An apparatus for the described purpose comprising a charging-hopper, having swinging bottom members adapted to scrape its side edges in opening and closing; a weighing-scale upon which said hopper is supported whereby the net weight of the charge in the hopper is ascertained by compensation for the fixed weight of the hopper; means, independent of the hopper for supplying the latter with a charge; a traveling conveyer for introducing a container under the charging-hopper and supporting it there independent of the hopper and scale; a connection between the axes of the swinging bottom members of the hopper whereby they act in unison; a lever on the axis of one of said members; a spring-controlled stop acting against the end of the container to arrest it while receiving its charge and to release it when charged, to continue its advance; and a spring-controlled push-rod associated with the lever operating the swinging hopper bottoms, adapted to make and break contact with said stop to depress it and allow its return.

5. An apparatus for the described purpose comprising a charging-hopper; a weighing scale upon which said hopper is supported; whereby the net-weight of the charge in the hopper is ascertained by compensating for the fixed weight of the hopper; a traveling conveyer independent of the hopper and scales for advancing a line of containers successively under said hopper, there being forms on the containers having end spacing lugs to provide a space between adjacent containers; a spring-controlled stop adapted to play into and out of said space for arresting the foremost container under the hopper; and means for dumping the net weight charge from the hopper into the foremost container while so arrested.

In testimony whereof I have signed my name to this specification in the presence of two subscribing witnesses.

CHARLES F. FLEMING.

Witnesses:
WM. F. BOOTH,
D. B. RICHARDS.

Copies of this patent may be obtained for five cents each, by addressing the "Commissioner of Patents, Washington, D. C."